United States Patent [19]

Dubois et al.

[11] Patent Number: 4,894,985
[45] Date of Patent: Jan. 23, 1990

[54] THRUST REVERSER WITH MOVABLE DEFLECTOR

[75] Inventors: Claude A. G. Dubois, Honfleur; Xavier R. Y. Lore, Le Havre, both of France

[73] Assignee: Societe Anonyme Dite: Hispano Suiza, Saint Cloud, France

[21] Appl. No.: 223,021

[22] Filed: Jul. 22, 1988

[30] Foreign Application Priority Data

Jul. 29, 1987 [FR] France .................. 87 10731

[51] Int. Cl.$^4$ .............................................. F02K 1/70
[52] U.S. Cl. .............................. 60/226.2; 239/265.29
[58] Field of Search .............. 60/226.2, 230, 229; 239/265.27, 265.29, 265.31; 244/110 B, 12.5

[56] References Cited

U.S. PATENT DOCUMENTS

| | | | |
|---|---|---|---|
| 3,279,182 | 10/1966 | Heimintoller ........................ | 60/226 |
| 3,605,411 | 9/1971 | Maison et al. ..................... | 60/226.2 |
| 3,815,357 | 6/1974 | Brennan ........................... | 60/226 A |
| 4,410,152 | 10/1983 | Kennedy et al. ................ | 244/110 B |
| 4,485,970 | 12/1984 | Fournier et al. ................ | 239/265.29 |

FOREIGN PATENT DOCUMENTS 2559838 8/1985 France .
2156004A 10/1985 United Kingdom .

OTHER PUBLICATIONS

Machine Design, vol. 55, No. 2, Jan. 1983, pp. 78–79, Cleveland Ohio, USA, McLafferty: "New Thrust Control May Boost Fighter Maneuverability".

*Primary Examiner*—Donald E. Stout
*Attorney, Agent, or Firm*—Bacon & Thomas

[57] ABSTRACT

The present invention relates to a thrust reverser system for a turbofan-type turbojet engine having thrust reverser doors with movable deflectors. The deflectors are movably attached to an upstream edge of the thrust reversing doors and are movable between retracted and extended positions. When the thrust reversing door is closed and the turbojet engine operates in its normal thrust mode, the deflectors are retracted thereby enabling the difference between the inner surface of the thrust reversing door and the theoretical aerodynamic flow line to be reduced or eliminated. When the thrust reversing door is in the thrust reversing position, the deflector is extended so as to protrude beyond the inner surface of the door so as to direct the air flow in a more forward direction to increase the thrust reversing capabilities of the system. The deflectors are mounted on the thrust reversing door such that they are automatically extended when the thrust reversing door moves to the thrust reversing position.

26 Claims, 11 Drawing Sheets

THRUST REVERSER WITH MOVABLE DEFLECTOR

BACKGROUND OF THE INVENTION

The present invention relates to a thrust reverser for a turbofan-type turbojet engine having thrust reversing doors to redirect the airstream, more particularly such a thrust reverser having movable deflectors on the thrust reversing doors.

A turbofan-type turbojet engine comprises a primary exhaust flow duct extending coaxially with the longitudinal axis of the engine for exhausting the hot gases after passing through the turbine stages, and a secondary annular duct extending around the primary exhaust flow duct concentrically therewith to serve as an exhaust duct for the air flow generated by the turbofan. In such engines having a relatively high bypass ratio, the thrust reversing system may be applied solely to the air flow passing through the secondary annular duct. Due to the relatively high bypass ratio, the deflection of these gases in a direction having a forward component will provide a sufficient thrust reversing effect.

Thrust reversing devices are also well known in the art and may comprise one or more thrust reversing doors pivotally attached to the annular wall forming the secondary duct. The doors are movable between a retracted position, in which the outer surface of the door is substantially flush with the outer surface of the secondary duct and in which the air passing through the annular duct is unimpeded by the door.

Actuating means are provided to pivot the door such that an upstream edge is moved radially outwardly while a downstream edge is moved radially inwardly such that all or a large portion of the air passing through the secondary duct is deflected through a laterally facing opening in the annular wall forming the duct. The air directed through this opening has a forward acting component to supply the requisite reverse thrust.

A typical secondary annular duct having a thrust reversing system is illustrated in FIGS. 1 and 2, the annular duct comprising a fixed upstream portion 1, a thrust reversing system 2 and a fixed rear collar portion 3. The fixed upstream portion 1 comprises an outer panel 4, which defines an outer air flow surface, and an inner panel 5 which defines the outer boundary of the annular passage through which the air from the turbofan passes. This annular passage is defined between the inner surface 5 of the secondary duct and the wall 50 (See FIG. 9) of the primary, hot gas flow duct. An upstream frame 6 interconnects the outer panel 4 and the inner panel 5, and provides a mounting point for the door actuator 7a. Typically such actuator comprises a cylinder with an extendable and retractable piston rod connected to the thrust reversing door 7. Door 7 is pivotally attached to the annular duct such that, as the piston rod is extended, the upstream edge of the door 7 (toward the left as viewed in FIG. 1) moves radially outwardly, while the downstream edge of the door 7 moves radially inwardly so as to uncover a laterally facing opening through the annular duct. The doors 7 are shown in their extended positions in FIG. 2.

Depending upon the specific application of the turbofan engine, any number of such thrust reversing doors may be utilized.

The inner surface of the thrust reversing doors 7 may have an indentation 7b, illustrated in FIG. 2, to provide space for the actuator 7a when the doors 7 are in the retracted position, as illustrated in FIG. 1.

The passage of the air through the laterally facing opening during reverse thrust operation is assisted by the deflection edge 8 formed as part of the inner panel 5. Each of the thrust reversing doors 7 comprises an outer panel 9 which, in the retracted position shown in FIG. 1, is substantially flush with outer surface of outer panel 4 to provide a continuous aerodynamic wall to facilitate the air flow indicated by arrow 10. Each door also has an inner panel 11 defining inner door surface and a structure 12 which may interconnect panels 9 and 11 and also provide a convenient attachment point for the actuator piston rod.

In order to maximize the efficiency of the thrust reverser, each thrust reversing door 7 has a deflector 13 affixed to its upstream edge. The deflectors 13 have portions which extend radially inwardly from the inner surface of the door defined by inner panel 11. When the doors are in their thrust reversing position, the deflectors 13 serve to impart a more forward direction to the air passing through the laterally facing opening, and, therefore serve to increase the efficiency of the thrust reverser.

The efficiency of the thrust reverser is also increased by orienting the inner panel 11 such that its upstream edge (left edge as viewed FIG. 1) is closer to the outer panel 9 than is the rear edge. While this serves to increase the efficiency of the device when the thrust reversing doors 7 are in their thrust reversing or extended positions, the inner panel 11 is radially displaced from the most efficient aerodynamic air flow surface, (indicated by dashed line 14 in FIG. 1) when the doors are in their closed positions. Line 14 corresponds to the most efficient aerodynamic air flow passing through the inner annular duct between the upstream fixed portion 1 and the downstream collar 3 indicated by arrow 15. By forming the inner surface of the inner panel 11 in the known fashion, a cavity 16 is defined between the inner panel 11 and the theoretical aerodynamic flow line 14. A portion of the flow 15 passes into the cavity 16 over the deflection edge 8 thereby causing air flow distortion and perturbations in the air flow, thereby reducing the aerodynamic efficiency of the system.

Other thrust reversing systems incorporating pivotable thrust reversing doors are shown in French Patent No. 2,559,838 and U.S. Pat. Nos. 4,485,970 to Fournier et al. and 4,410,152 to Kennedy et al. However, none of the prior art systems have resolved the problem of improving the air flow contour of the inner surface of the thrust reversing doors to match the ideal aerodynamic surface when the doors are in their closed positions. If the volume of the cavity 16 is reduced by moving the upstream edge of the inner panel 11 radially inwardly, the length of the deflector 13 extending beyond this surface is reduced, thereby reducing the efficiency of the device when the doors are in their thrust reversing positions.

SUMMARY OF THE INVENTION

The present invention relates to a thrust reverser system for a turbofan-type turbojet engine having thrust reverser doors with movable deflectors. The deflectors are movably attached to an upstream edge of the thrust reversing doors and are movable between retracted and extended positions. When the thrust reversing door is closed and the turbojet engine operates in its normal thrust mode, the deflectors are retracted thereby enabling the difference between the inner surface of the thrust reversing door and the theoretical aerodynamic flow line to be reduced or eliminated. When the thrust reversing door is in the thrust reversing position, the deflector is extended so as to protrude beyond the inner surface of the door so as to direct the air flow in a more forward direction to increase the thrust reversing capabilities of the system.

Various embodiments are disclosed for mounting the deflectors on the thrust reversing door such that they are automatically extended when the thrust reversing door moves to the thrust reversing position.

DETAILED DESCRIPTION OF THE PREFERRED EMBODIMENTS

Figure 1:
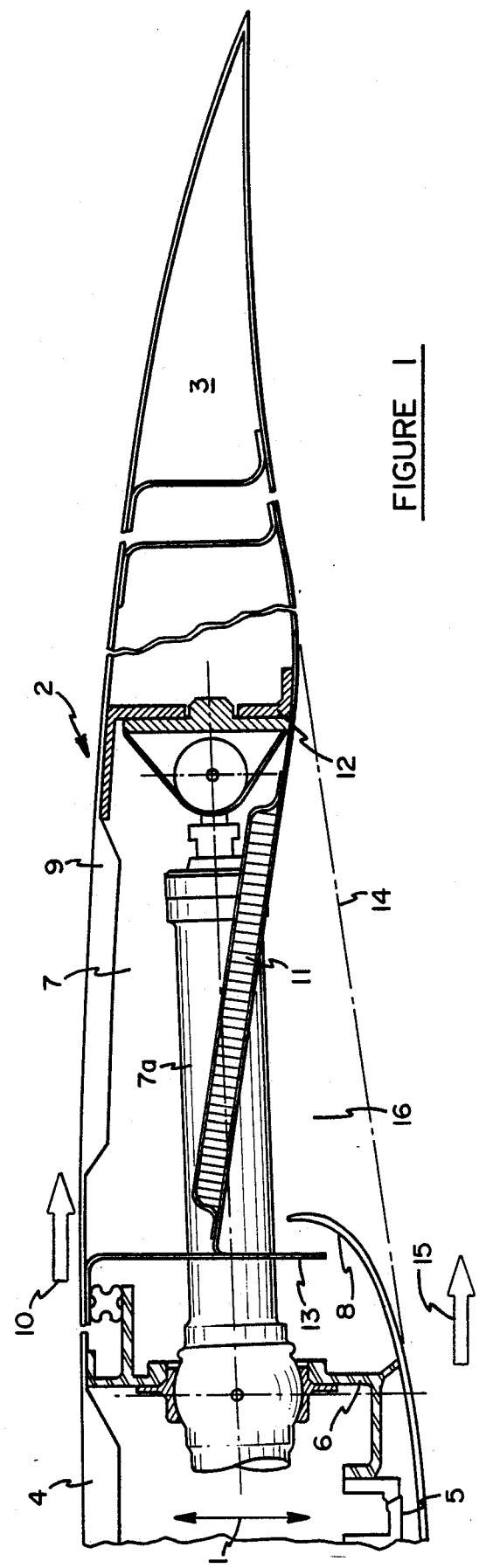
FIG. 1 is a partial, cross-sectional view of a secondary, annular duct incorporating a known thrust reversing system.
Figure 3:
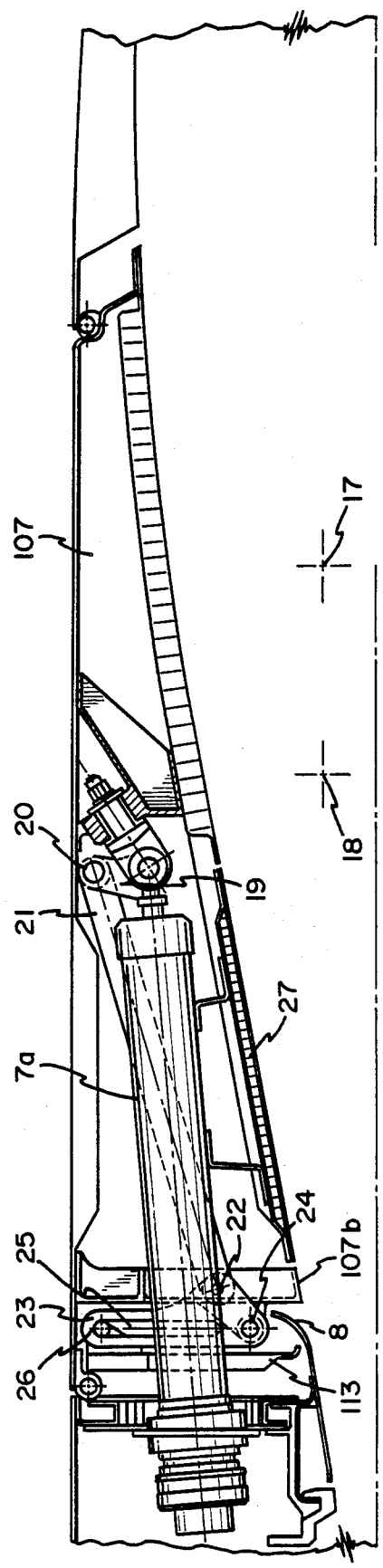
FIG. 3 is a partial, longitudinal cross-sectional view of an annular duct incorporating a first embodiment of the thrust reversing system according to the invention.
Figure 2:
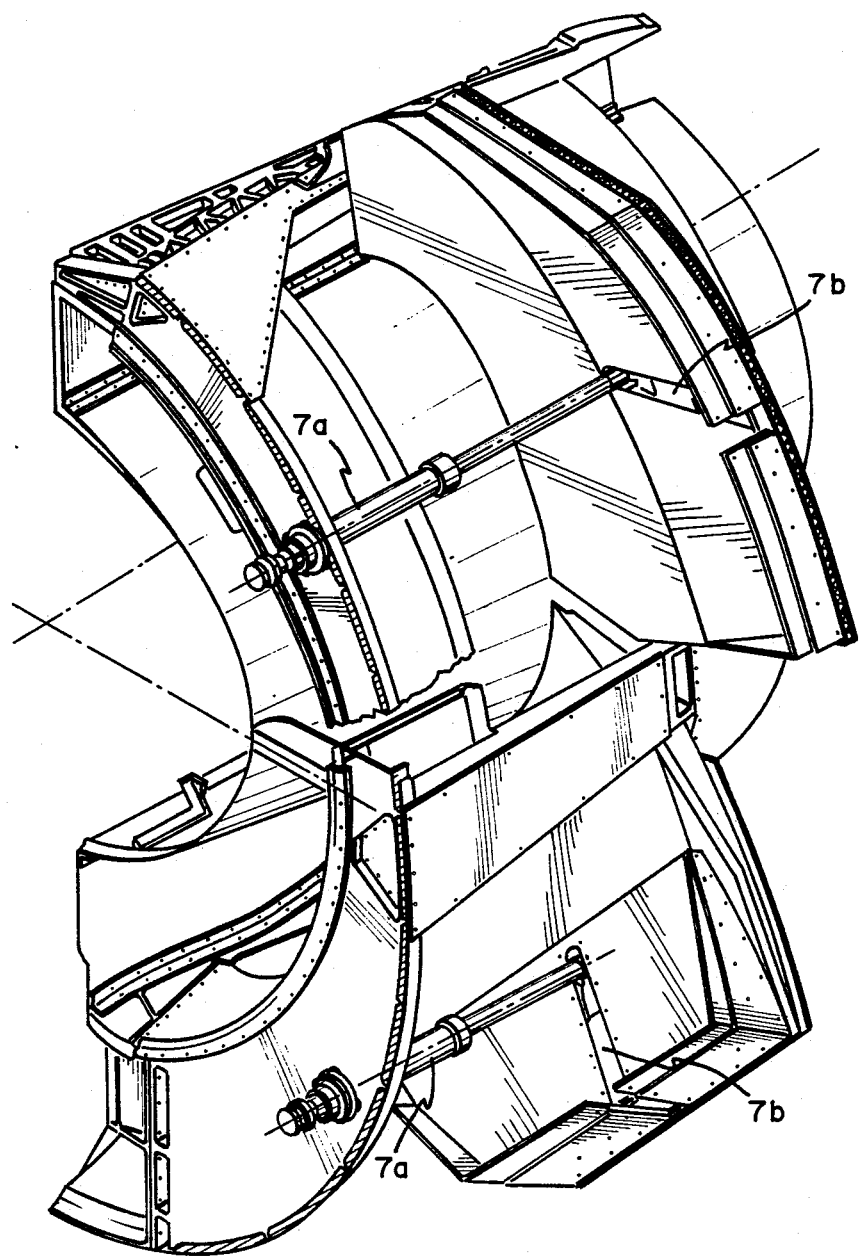
FIG. 2 is a partial perspective view of the annular duct of FIG. 1 showing the thrust reversing doors in their open positions.
Figure 4:
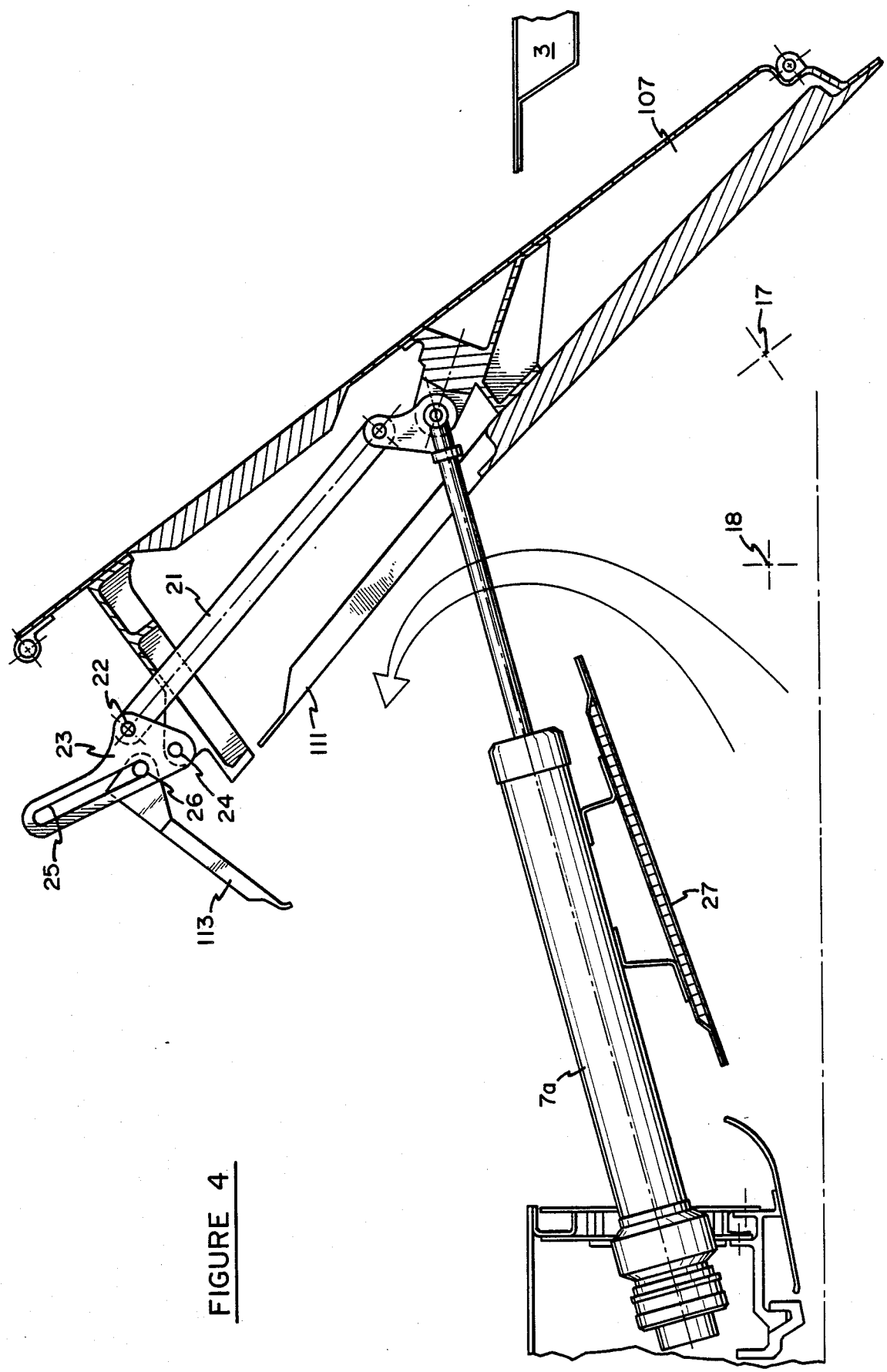
FIG. 4 is a partial, longitudinal cross-sectional view of the embodiment shown in FIG. 3 with the thrust reversing door in the open position and the deflector in the extended position.
Figure 5:
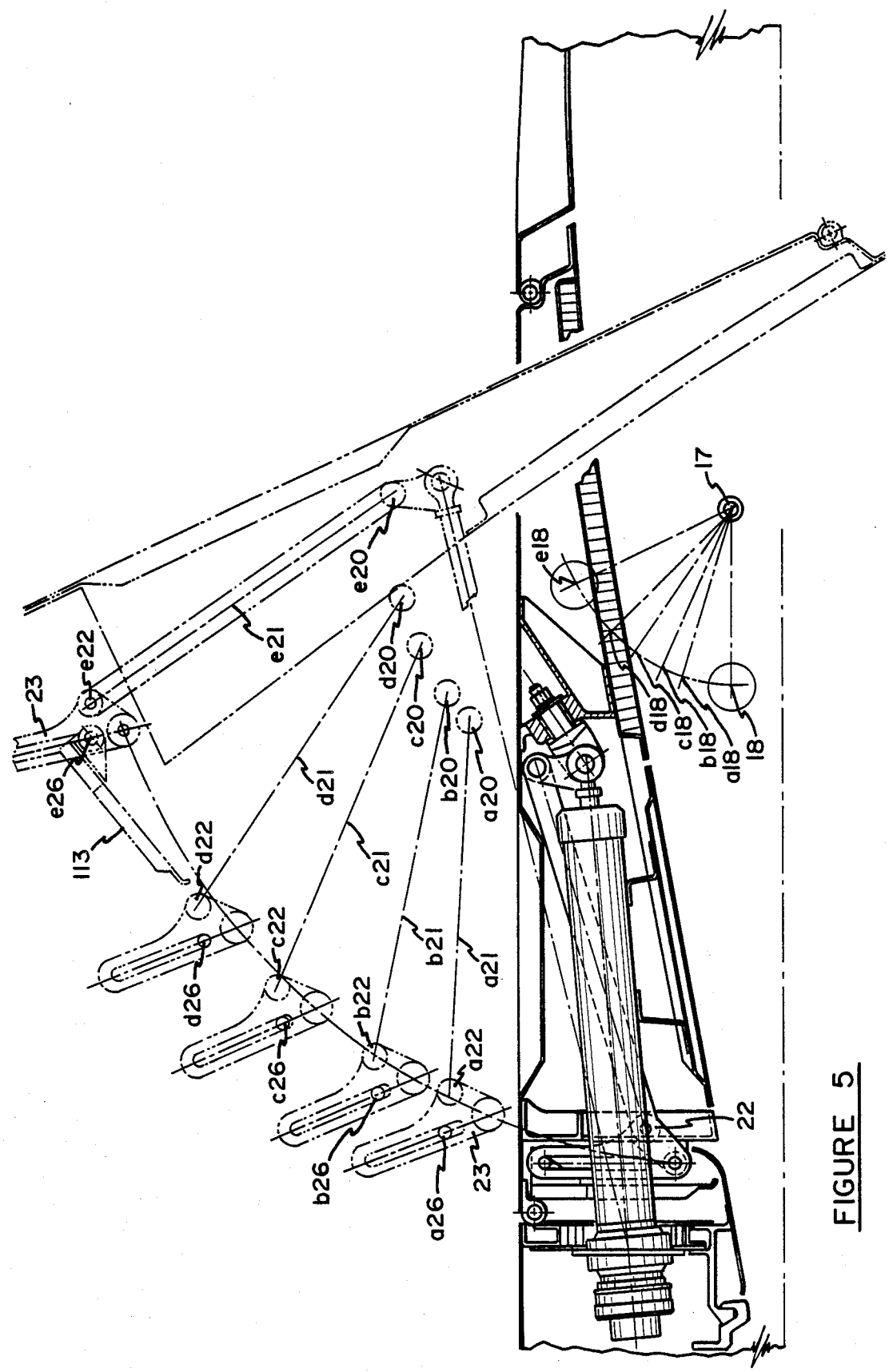
FIG. 5 is a partial, longitudinal sectional view schematically illustrating the positions of the elements of the first embodiment of the invention as the thrust reversing door moves from its closed to its opened position.

The first embodiment of the thrust reversing system according to the invention is illustrated in FIGS. 3–5 and 8. The elements in common with the known system illustrated in FIGS. 1 and 2 are identified by the same numerals. The thrust reverser door 107 is attached to the annular wall structure so as to pivot about axis 17 extending generally perpendicular to the longitudinal axis 51 of the annular duct. The door 107 may pivot between a first, closed position, as illustrated in FIG. 3 during the normal thrust operation of the engine, and a second or opened position illustrated in FIG. 4 in which the air normally passing from upstream to downstream (left to right as viewed in FIGS. 3–5) will now be directed through a laterally facing opening in the annular wall and redirected so as to have a forward acting component to provide the requisite thrust reversing forces. This position is illustrated in FIGS. 4 and 5.

Figure 8:
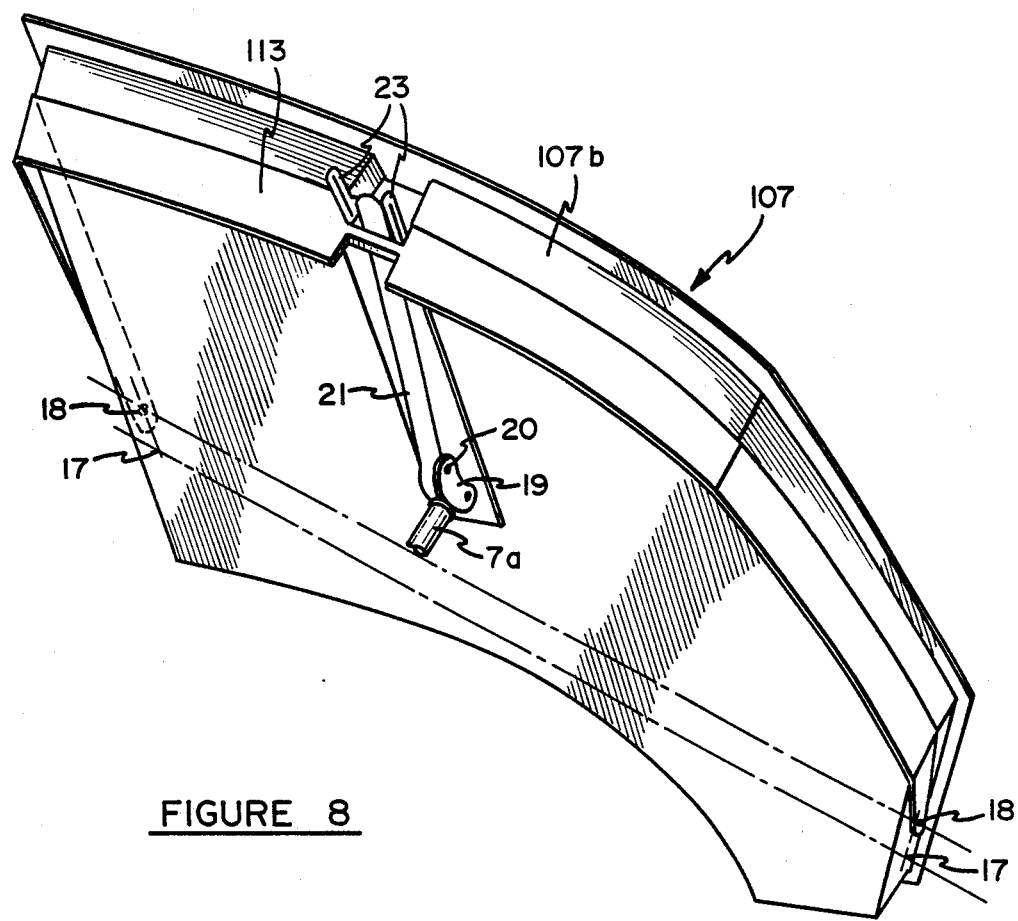
FIG. 8 is a perspective view showing a thrust reversing door incorporating the movable deflectors of FIGS. 3 and 4 with the deflector in the extended position.

A movable deflector 113, which may be generally planar, is attached to the upstream edge of thrust reverser door 107 so as to pivot about a second lateral axis 18 extending generally parallel to, but displaced from, axis 17 of door 107. The axes 17 and 18 and their respective positions in regard to the door 107 and the deflector 113 are illustrated in FIG. 8. The deflector 113 may have longitudinally extending arms that are attached to the door 107 so as to pivot about axis 18.

The end of the piston rod of actuator 7a is attached to the door by attaching member 19 such that extension and retraction of the piston rod will cause the door to move between the positions shown in FIGS. 3 and 4.

Attaching member 19 is also pivotally attached to link rod 21 via shaft 20. The opposite end of link rod 21 is pivotally attached to drive member 23 which, in turn, is pivotally attached to the upstream edge of door 107 by pivot 24, drive member 23 also defines an elongated slot 25 which slidably accommodates roller 26 attached to and extending laterally from movable deflector 113.

FIG. 5 is a kinematic diagram illustrating various positions of the elements as the door moves between the closed position and the opened position. The hinge pivot point 18 moves successively through positions 18a–18e, the latter position corresponding to the fully open position of door 107. Similarly, shaft 20 moves successively through positions 20a–20e, while link rod 21 also moves between positions 21a–21e. Similar designations indicate the various positions of the shaft 22, interconnecting link rod 21 with drive member 23 and roller 26 which moves along slot 25.

As can be seen in, FIG. 3, the position wherein the door 107 is closed and the engine is operating in the forward thrust mode, the distal edge of deflector 113 does not extend radially inwardly beyond the inner surface of thrust reversing door 107. As the door is progressively open, the deflector 113 is displaced therefrom such that, in the open position, indicated by the small e in FIG. 5, the distal edge extends substantially beyond the inner surface so as to impart a forward component to the deflected air. Since the deflector 113 is movable with respect to the inner panel 111 of door 107, the panel 111 may be oriented such that its radially inner surface lies on the ideal aerodynamic line, thereby eliminating the cavity 16 of the prior art devices. In order to further increase the aerodynamic efficiency through the interior of the annular duct, a sealing plate 27, having an inner surface in alignment with that of inner panel 111, may be attached to the actuator 7a. Thus, when the thrust reversing door 107 is in the first or closed position, a smooth surface is presented to the air flowing through the duct in the direction of arrow 15.

Figure 6:
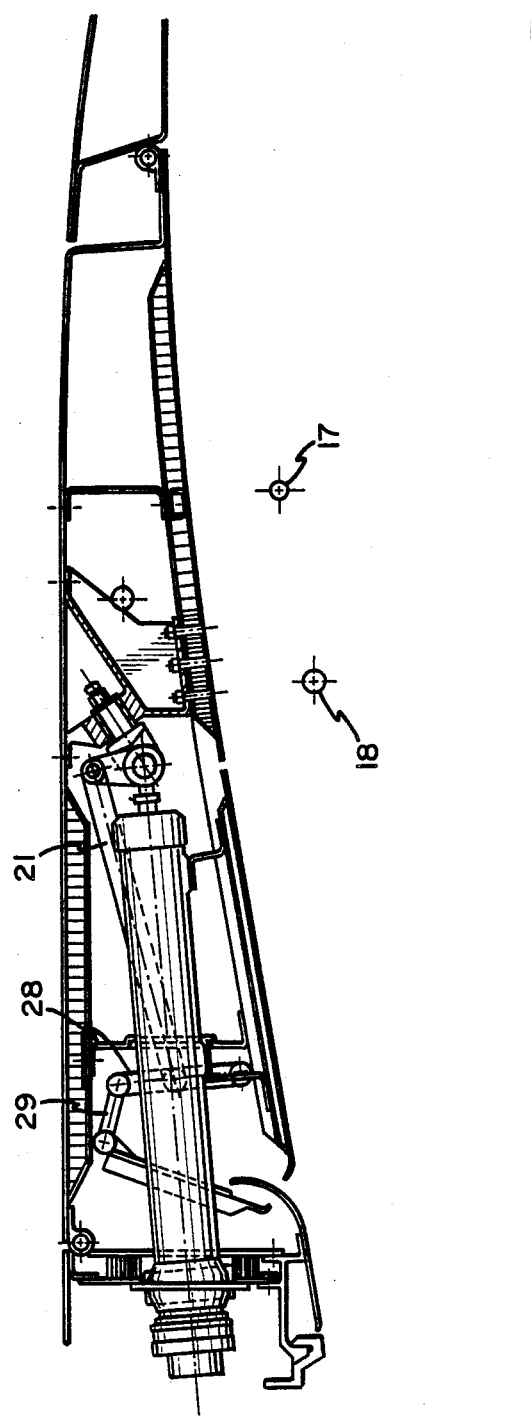
FIG. 6 is a partial, longitudinal cross-sectional view of a second embodiment of the thrust reversing system according to the invention with the thrust reversing door in the closed position and the deflector in retracted position.
Figure 7:
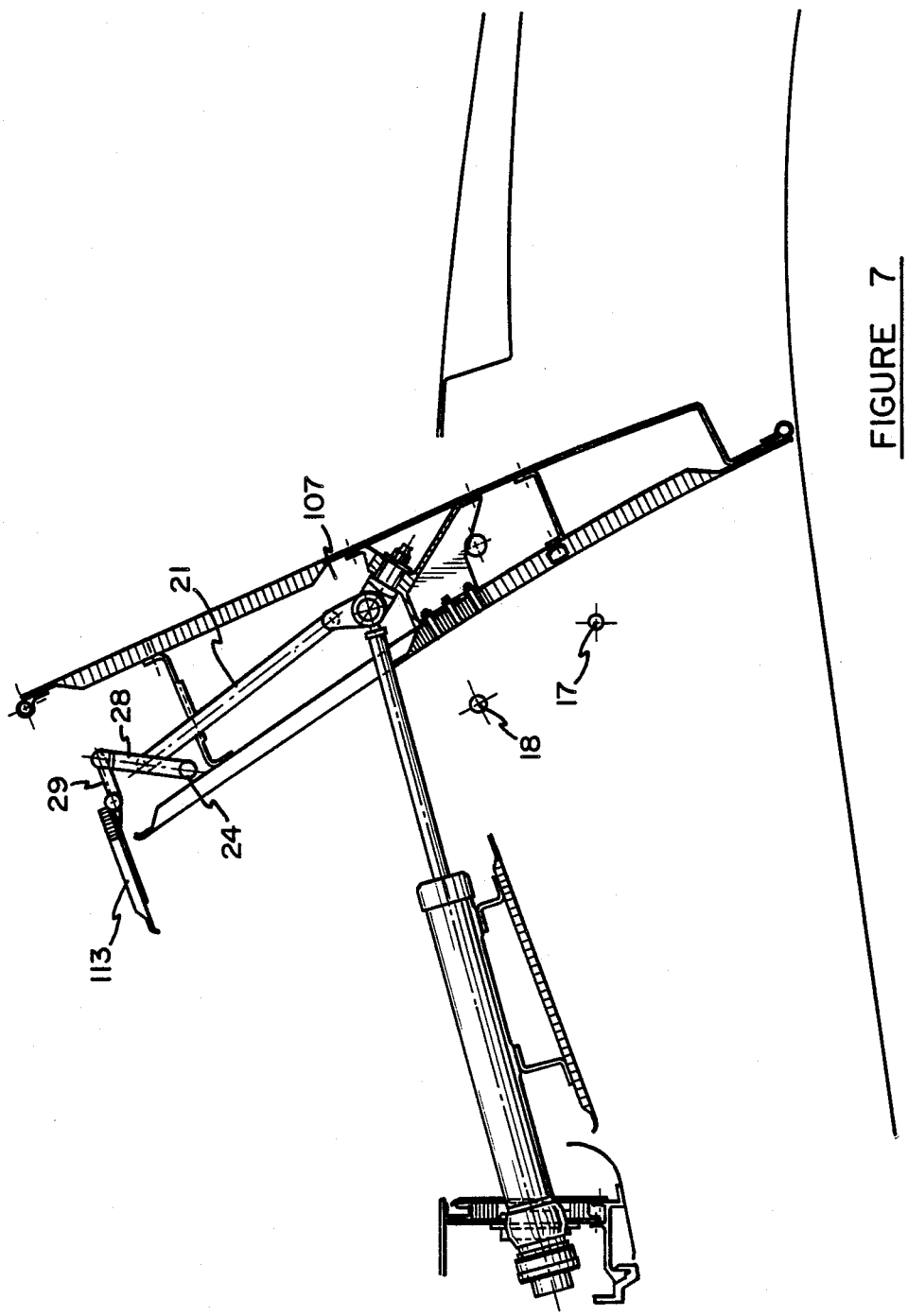
FIG. 7 is a partial, longitudinal sectional view of the embodiment shown in FIG. 6 with the thrust reversing door open and the deflector extended.

FIGS. 6 and 7 illustrate a slightly modified embodiment of the structure shown in FIGS. 3–5. In this embodiment, the drive member 23 has been replaced by link rods 28 and 29. Link rod 28 has a first end pivotally attached to inner panel 111 of thrust reverser door 107 by shaft 24 and an opposite end pivotally attached to one end of link rod 29. Link rod 29 is connected to movable deflector 113. The second end of link rod 21 is attached to link rod 28. As shown in FIG. 6, when the door is in the closed position, the deflector 113 does not extend below the surface of inner wall 111 of the thrust reversing door 107. However, when the door 107 is moved to the opened position, as illustrated in FIG. 7, the deflector is extended so as to further deflect the air in a thrust reversing direction.

Figure 9:
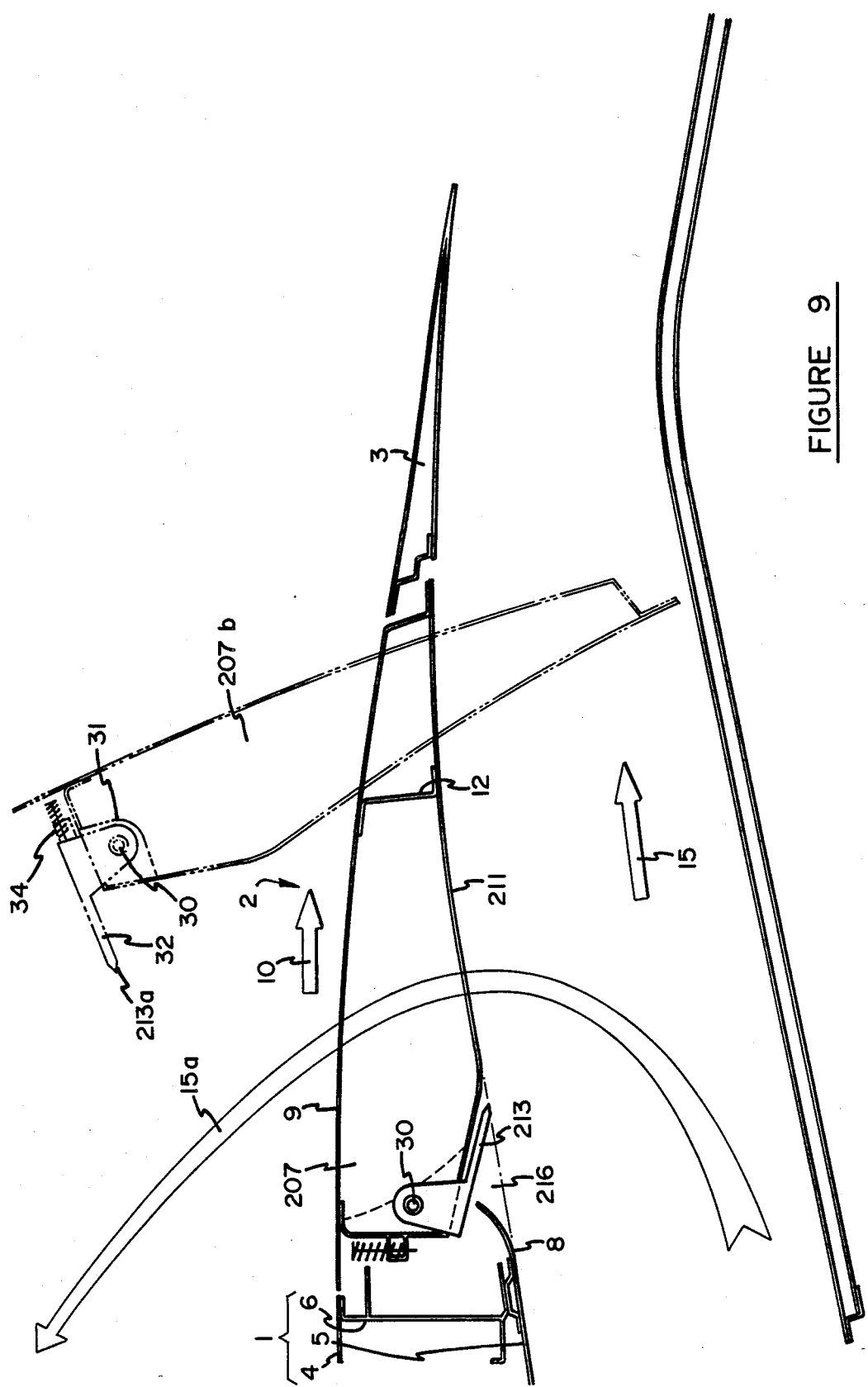
FIG. 9 is a partial, longitudinal cross-sectional view illustrating a third embodiment of the movable deflectors according to the invention.
Figure 10:
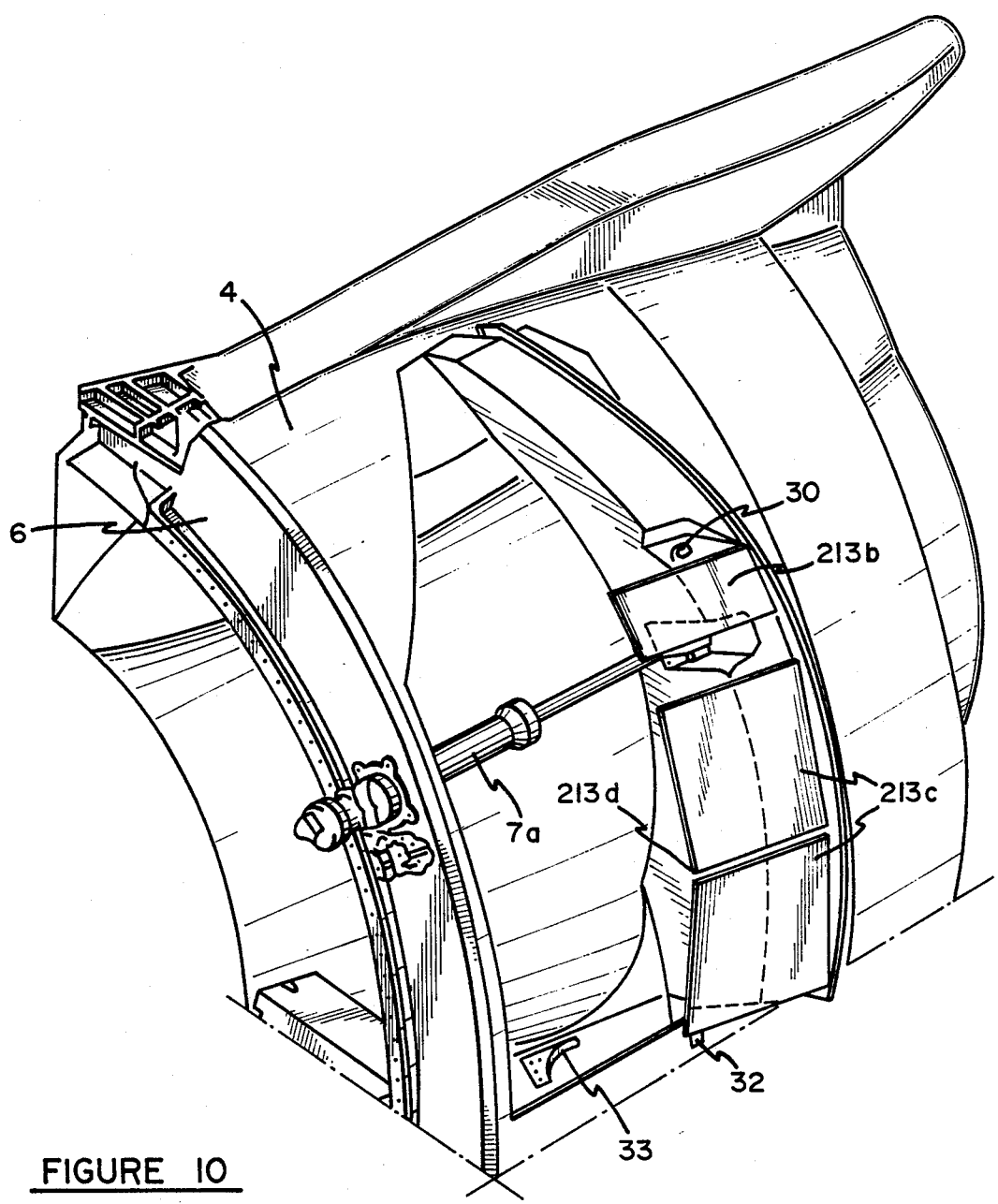
FIG. 10 is a partial, perspective view of the annular duct of FIG. 9 with the thrust reversing door in the opened position.

A third embodiment of the thrust reversing system incorporating a movable deflector is illustrated in FIGS. 9 and 10. In this embodiment, thrust reversing door 207 has an inner panel defining an inner surface 211 and is movable between closed and opened positions in the same fashion as the previously described embodiments. Movable deflector 213 is pivotally attached to the upstream edge portion of the thrust reverser door 207 by flanges 213e and pivoting shaft 30. FIG. 9 illustrates the door 207 in its closed position in solid lines with the deflector 213 in its retracted position, and the door 207 in the open positioned in phantom lines as well as the deflector 213 in its extended position. In this embodiment, the movable deflector 213 does not occupy the space between the upstream edge of door 207 and the annular frame structure 6 of the annular duct 1. When the door 207 is in its closed position, the movable deflector 213 is folded back against an upstream portion of the inner surface 211. The upstream portion of this inner surface 211 may be raised so as to accommodate the deflector 213, thereby forming a slight cavity 216 between the deflector and the theoretical aerodynamic flow line when the door is in its closed position. Although cavity 216 is presented by this embodiment, it is of substantially less size than the cavity 16 of the prior art devices, hence the air flow 15 through the annular duct is substantially improved.

When the thrust reverser door 207 is in its opened position, as indicated in phantom lines in FIG. 9, the deflector 213 is extended in order to redirect the air flow in the direction of arrow 15a. The upstream edge portion of the thrust reverser door 207 may be define cavities 31 in which the shaft 30 is pivotally retained. The shaft 30 may be subdivided into two portions on either side of the deflector 213.

A laterally extending guide boss 32 extends laterally from the deflector 213 near the distal edge 213a. The laterally extending guide boss 32 cooperates with a fixed guide plate 33 (illustrated in FIG. 10) joined to the annular duct to assist in the extension and retraction of the deflector during movement of the thrust reverser door 207. The interengagement of the guide boss 32 with guide plate 33, as the door 207 moves away from its closed position serves to move the distal edge 213a away from inner surface 211. During the closure of the door 207 the interengagement of guide boss 32 with guide plate 33 serves to urge the distal edge 213a toward the inner surface 211.

The distal edge 213a may have a bevel shape such that, when the door 207 is moving to its opened position, the aerodynamic forces exerted on the extended position. An adjustable stop 34 may be mounted on the upstream edge portion of the thrust reversing door 207 in order to limit the motion of deflector 213.

As illustrated in FIG. 10, each deflector 213 may be formed in two parts 213b and 213c located on either side of the actuator 7a. These two parts may be further subdivided along line 213d.

Figure 11:
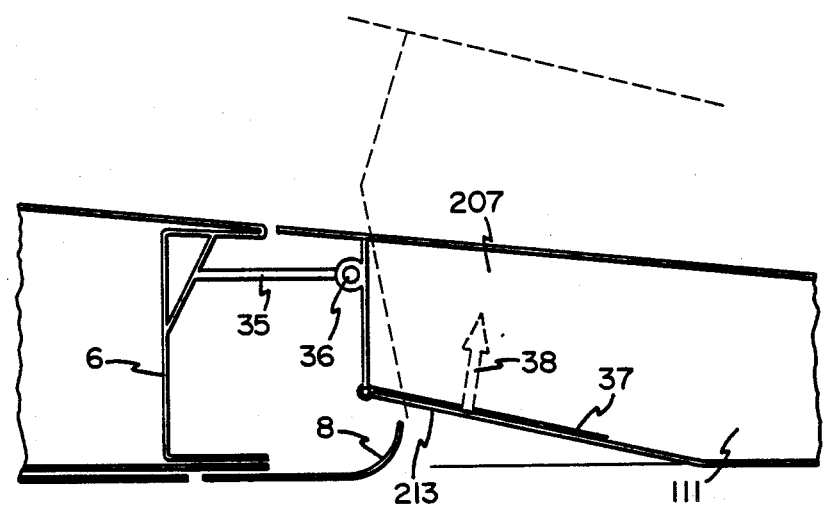
FIG. 11 is a schematic illustration of a fourth embodiment of the thrust reversing device according to the invention.
Figure 12:
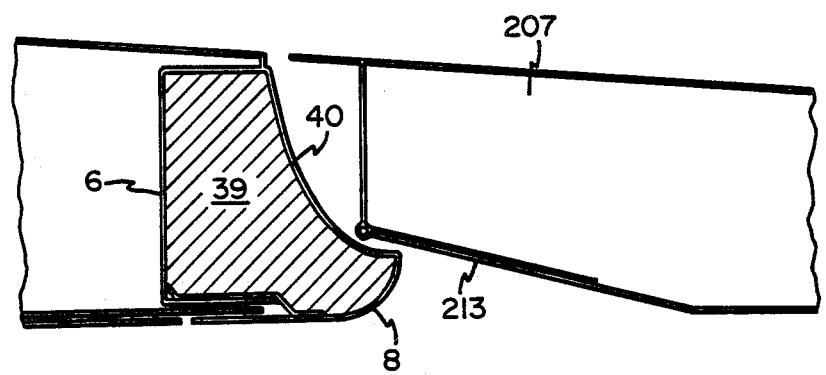
FIG. 12 is a schematic illustration of a fifth embodiment of the thrust reversing system according to the invention.

In conjunction with the movable deflector 213 illustrated in FIGS. 9 and 10, a pushrod 35 having a anti-friction roller 36 attached to its distal end may be mounted on structure 6 so as to extend downstream therefrom such that the anti-friction roller 36 is adjacent the upstream edge of thrust reversing door 207. The anti-friction roller 36, illustrated in FIG. 11, may further be covered with an anti-friction material, such as teflon, and may contact the deflector 213 as the thrust reversing door 207 returns to its closed position in order to initiate the retraction of the deflector toward the inner surface 211. The pushrod 35 is sized so as to avoid any interference between the edge 213a of the deflector 213 and the deflection edge 8. Once the edge 213a clears the deflection edge 8, the deflector 213 may be retracted by contact against the deflector edge 8.

The inner surface 211 of the thrust reversing door 207 may be define an indentation 37 formed adjacent its upstream edge to accommodate the deflector 213 in its retracted position. The deflector 213 may be retained in its retracted position by the aerodynamic forces pushing against its innermost surface when the engine is operating in the normal thrust mode. An air vent 38 may be provided between the inner surface 211 covered by the deflector 213 in its retracted state and the ambient air to further assist in holding the deflector 213 in its retracted position.

A longitudinally and radially extending partition 39 may be attached to the annular frame structure 6 so as to extend downstream therefrom in a generally longitudinal direction. The partition 39 divides the annular cavity defined by the frame structure 6 into one or more sub-cavities to decrease the aerodynamic resonance of the thrust reverser and the pulse modes relating to the turbojet engine fan. It is to be understood that several such longitudinally extending partitions 39 may be utilized at various positions around the structure 6. The downstream edge 40 of partition 39 may have a suitable contour to urge the deflector 213 toward its retracted position as the thrust reversing door 207 approaches its closed position. Either the downstream edge 40 or the appropriate portion of deflector 213 may be covered by an anti-wearstrip to minimize the friction and wear caused by the contact between these elements. Although partition 39 is shown utilized in conjunction with the embodiment of the deflector illustrated in FIGS. 9 and 10, it is to be understood that it may also be utilized with any of the other embodiments of this invention.

Figure 13:
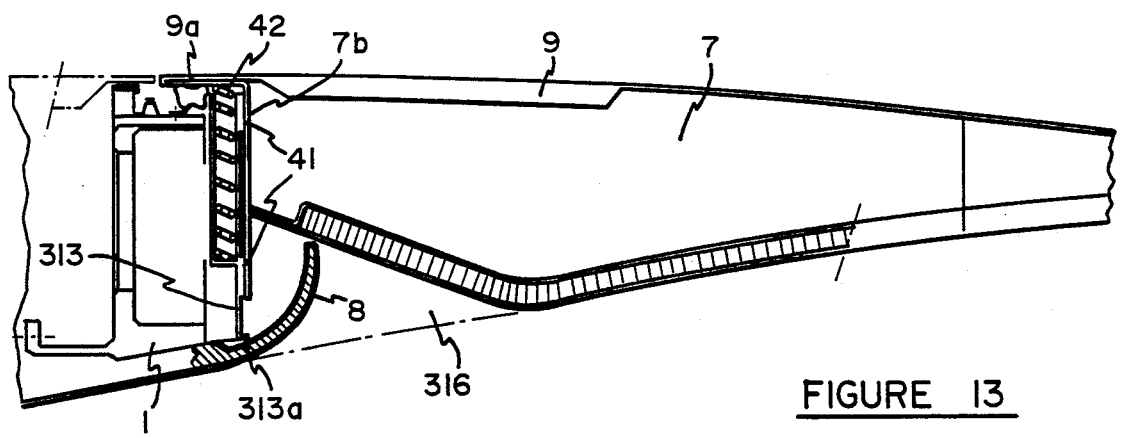
FIG. 13 is a partial, longitudinal cross-sectional view showing a sixth embodiment of the movable deflectors according to the invention.

In the embodiment shown FIG. 13, the movable deflector 313 moves on slides 41 affixed to the upstream wall 307a of the thrust reversing door 307. Springs 42 are interposed between the deflector 313 and the upstream edge 9a of the outer panel 9 of the thrust reverser door 307. Springs 42 exert a force on the deflector 313 urging it toward its extended position. Thus, as the thrust reversing door 307 moves from the closed position, shown in FIG. 13, to its opened position, springs 41 will urge the deflector 313 toward its extended position. As the door 307 returns to its closed position, the radially innermost end 313a of the deflector bears against the deflection edge 8, thereby compressing the springs 42 and allowing the door 307 to reach its fully closed position. Although a cavity 316 is presented by the upstream portion of the inner door surface, the use of the movable deflector 313 enables this cavity to be notably smaller than those present in the prior art devices.

Figure 14:
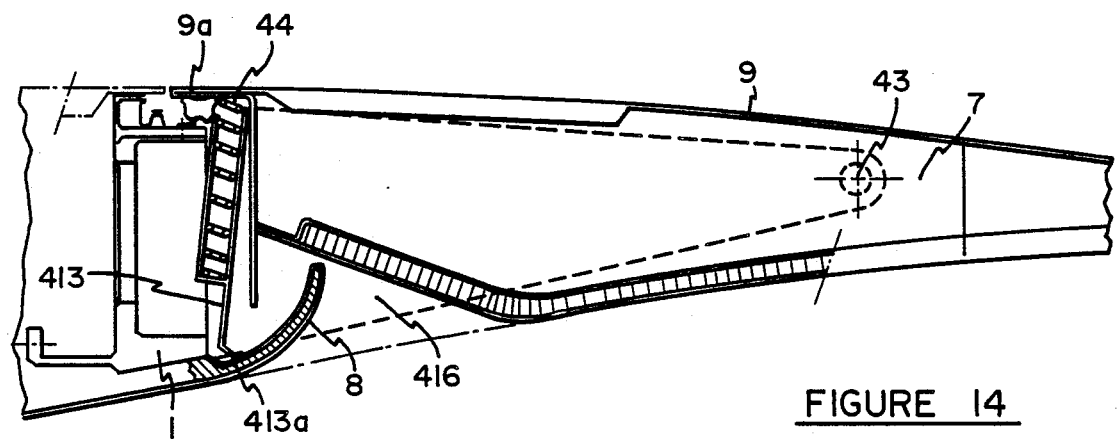
FIG. 14 is a partial, longitudinal cross-sectional view showing a seventh embodiment of the movable deflectors according to the invention.

Another embodiment of the movable deflector according to the invention is shown in FIG. 14 and comprises movable deflector 413 having generally longitudinally extending arms 413b extending therefrom which are attached to the thrust reversing door 407 at pivots 43. Spring 44 is interposed between the deflector 413 and the upstream edge portion 9a of outer panel 9 so as to exert a force on the deflector urging it toward its extended position. When the thrust reversing door 407 moves away from its closed position, illustrated in FIG. 14, the spring serves to extend the deflector 413. When returning to the closed position, the distal edge 413a of the deflector bears against the deflection edge 8, thereby compressing the spring 44 and enabling the thrust reversing door 407 to reach its fully closed position. As in the embodiment shown in FIG. 13, this embodiment forms a cavity 16 which is substantially smaller than those cavities formed in the prior art devices.

Figure 16:
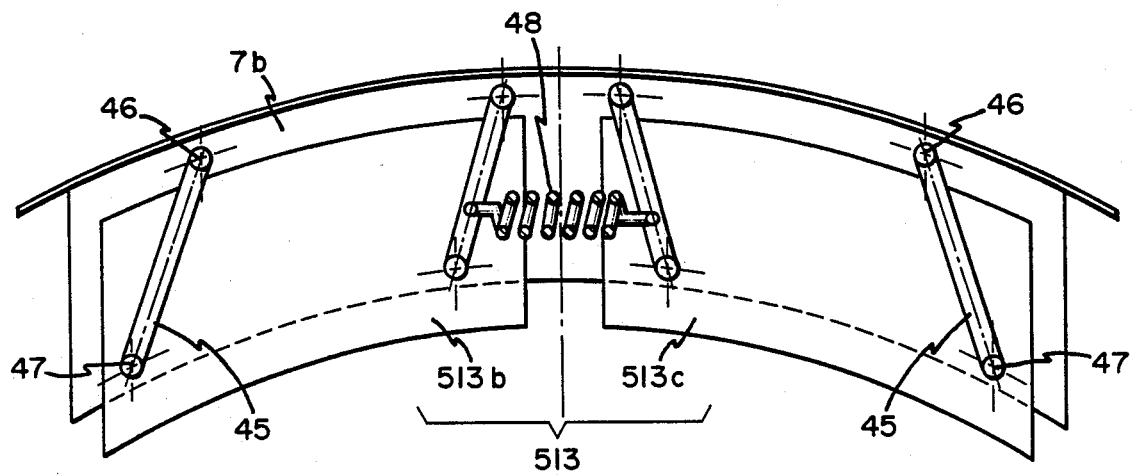
FIG. 16 is a partial, front view of the deflectors shown in FIG. 15 viewed in the direction of arrow F in FIG. 15.
Figure 15:
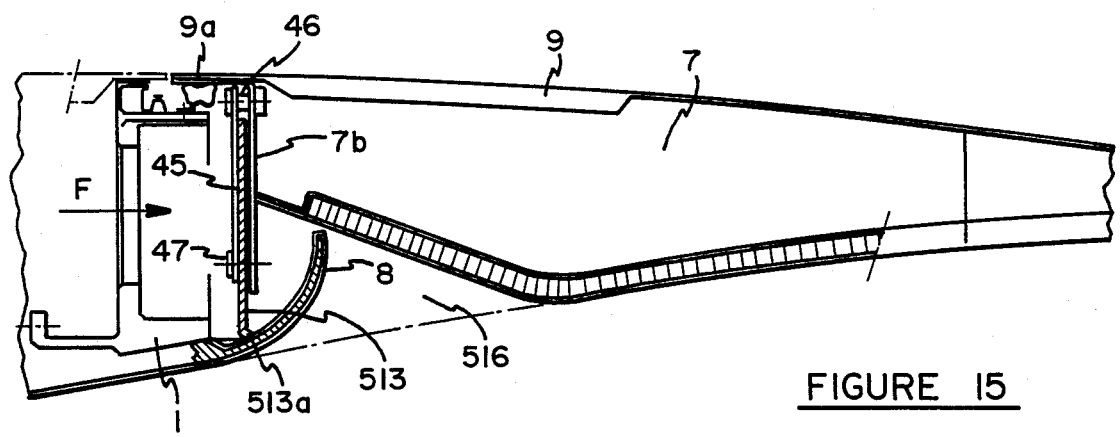
FIG. 15 is a partial, longitudinal cross-sectional view showing an eighth embodiment of the movable deflectors according to the invention.

In the embodiment shown in FIGS. 15 and 16, the deflector 513 is generally planar in structure and is movably attached to the upstream edge 507a of the thrust reversing door 507 by rods 45. A pair of parallel rods 45 serves to attach each of the deflectors 513a and 513c illustrated in FIG. 16 to the edge 507a by pivots 46 and 47. A tension spring 48 interconnects rods 45 of adjacent deflectors 513 so as to urge the deflectors into their extended positions. As the thrust reversing door 507 opens, the forces exerted on the deflectors by spring 48 will urge them to their extended positions. During closure of the door 507 the distal edges 513a of the deflectors 513 will engage deflection edges 8 and force them into their retracted positions as the thrust reversing door 507 is fully closed. As in the previous embodiment, a cavity 516 is present at the upstream portion of thrust reversing door 507, but this cavity is significantly smaller than those in the prior art devices, thereby serving to increase the efficiency for the engine.

The foregoing description is provided for illustrative purposes only and should not be construed as any way limiting this invention, the scope which is define solely by the appended claims.

We claim:

1. In a turbofan-type turbojet engine having an annular wall defining an exhaust passage substantially coaxial with the longitudinal axis of the engine for air driven by the turbofan in an upstream-to-downstream direction, the annular wall defining at least one generally laterally facing opening, an outer air flow surface and an inner air flow surface, the improved thrust reversing device comprising:
   (a) at least one thrust reversing door having an upstream edge, a downstream edge, an outer surface and an inner surface;
   (b) means for pivotally attaching the thrust reversing door to the annular wall such that it pivots about a first pivot axis;
   (c) actuating means for moving the thrust reversing door between a first position wherein it covers the at least one laterally facing opening such that the outer surface is substantially flush with the outer air flow surface of the annular wall and air flow through the exhaust passage is unimpeded, and a second position wherein the laterally facing opening is uncovered and the thrust reversing door directs air outwardly through the opening so as to have an upstream acting component;
   (d) deflector means having a distal edge; and,
   (e) attaching means for movably attaching the deflector means to the thrust reversing door adjacent to the upstream edge such that it is movable between a retracted position wherein the distal edge does not extend beyond the inner surface of the thrust reversing door when the door is in the first position thereby allowing the inner surface of the thrust reversing door to be generally flush with the inner air flow surface of the annular duct, and an extended position wherein the distal edge extends substantially beyond the inner surface when the door is in the second position so as to direct the air emanating from the lateral opening in a generally upstream direction.

2. The improved thrust reverser according to claim 1 further comprising at least one longitudinal partition attached to the annular wall extending therefrom in a downstream direction and having a downstream edge adjacent to the upstream edge of the thrust reversing door.

3. The improved thrust reverser according to claim 1 wherein the attaching means comprising:
   (a) means for pivotally attaching the deflector means to the thrust reversing door such that it may pivot about a second pivot axis substantially parallel to the first pivot axis;
   (b) a drive member pivotally attached to the upstream edge of the thrust reverser door;
   (c) connecting means connecting the drive member to the deflector means;
   (d) an attaching member pivotally attached to the thrust reverser door; and,
   (e) a first link rod having a first end attached to the attaching member and a second end attached to the drive member.

4. The improved thrust reverser according to claim 3 further comprising at least one longitudinal partition attached to the annular wall extending therefrom in a downstream direction and having a downstream edge adjacent to the upstream edge of the thrust reversing door.

5. The improved thrust reverser according to claim 4 wherein the connecting means comprises:
   (a) an elongated slot defined by the drive member; and,
   (b) roller means attached to the deflector means and slidably received in the elongated slot.

6. The improved thrust reverser according to claim 3 wherein the drive member comprises:
   (a) a second link rod having a first end pivotally attached to the thrust reverser door and a second end;
   (b) means pivotally connecting the second link rod to the second end of the first link rod; and,
   (c) a third link rod pivotally attached to the second end of the second link rod and connected to the deflector means.

7. The improved thrust reverser according to claim 6 further comprising at least one longitudinal partition attached to the annular wall extending therefrom in a downstream direction and having a downstream edge adjacent to the upstream edge of the thrust reversing door.

8. The improved thrust reverser according to claim 1 wherein the deflector means comprises a plurality of generally planar deflectors.

9. The improved thrust reverser according to claim 8 wherein attachment means comprises:
   (a) mounting flanges on the deflectors extending generally perpendicular to the plane of the deflector;
   (b) means to pivotally attach the mounting flanges to the thrust reverser door.

10. The improved thrust reverser according to claim 9 wherein the thrust reverser door defines a plurality of cavities and wherein the means to pivotally attach the mounting flanges to the thrust reverser door comprises a shaft extending from the mounting flange into a cavity.

11. The improved thrust reverser according to claim 10 comprising two deflectors, one deflector located on each side of the actuating means.

12. The improved thrust reverser according to claim 10 further comprising:
   (a) a guide boss extending from a deflector in generally circumferential direction; and
   (b) a ramp guide affixed to the annular wall so as to slidably contact the guide boss during movement of the thrust reverser door between its first and second positions.

13. The improved thrust reverser according to claim 12 further comprising stop means mounted on the upstream edge of the thrust reverser door in the path of travel of the deflector so as to limit the movement of the deflector.

14. The improved thrust reverser according to claim 13 wherein the position of the stop means is adjustable.

15. The improved thrust reverser according to claim 14 further comprising a bevel surface formed on the distal edge of the deflector such that, during movement of the thrust reverser door from the first to the second position, the air passing through the laterally facing opening urges the deflector toward its extended position.

16. The improved thrust reverser according to claim 15 further comprising at least one longitudinal partition attached to the annular wall extending therefrom in a downstream direction and having a downstream edge adjacent to the upstream edge of the thrust reversing door.

17. The improved thrust reverser according to claim 8 further comprising:
   (a) a pushrod mounted on the annular wall such that a distal end extends in a downstream direction adjacent to the upstream edge of the thrust reverser door; and,
   (b) anti-friction means attached to the distal end of the pushrod so as to contact the deflector when the door moves from its second position to its first position so as to urge the deflector toward its retracted position.

18. The improved thrust reverser according to claim 8 wherein the deflector rests against the inner surface of the thrust reverser door in its retracted position and further comprising air vent means defined by the thrust reversing door and extending between a position on the inner surface covered by the deflector in its retracted position and the ambient air.

19. The improved thrust reverser according to claim 8 further comprising at least one longitudinal partition attached to the annular wall extending therefrom in a downstream direction, the partition having a downstream edge adapted to bear against the deflector as the thrust reverser door moves from its second position toward its first position is as to urge the deflector toward its retracted position.

20. The improved thrust reverser according to claim 1 further comprising:
   (a) a deflection edge formed on the annular wall and extending therefrom in the downstream direction into the path of travel of the deflector means as the thrust reverser door moves toward its first position; and,
   (b) spring means interposed between the deflector means and the thrust reverser door urging the deflector means toward its extended position.

21. The improved thrust reverser according to claim 20 further comprising at least one longitudinal partition attached to the annular wall extending therefrom in a downstream direction and having a downstream edge adjacent to the upstream edge of the thrust reversing door.

22. The improved thrust reverser door according to claim 20 further comprising:
   (a) mounting arms extending from the deflector means in a downstream direction; and,
   (b) means to pivotally attach the mounting arms to the thrust reverser door.

23. The improved thrust reverser according to claim 22 further comprising at least one longitudinal partition attached to the annular wall extending therefrom in a downstream direction and having a downstream edge adjacent to the upstream edge of the thrust reversing door.

24. The improved thrust reverser according to claim 8 wherein the attaching means comprises:
   (a) a pair of substantially parallel rods having first ends pivotally attached to a deflector and second ends pivotally attached to the thrust reverser door; and,
   (b) spring means interposed between rods of adjacent deflectors urging the deflectors toward their extended positions.

25. The improved thrust reverser according to claim 24 further comprising a deflection edge formed on the annular wall and extending therefrom in a downstream direction into the path of travel of the deflector as the thrust reverser door moves toward its first position.

26. The improved thrust reverser according to claim 25 further comprising at least one longitudinal partition attached to the annular wall extending therefrom in a downstream direction and having a downstream edge adjacent to the upstream edge of the thrust reversing door.

* * * * *

UNITED STATES PATENT AND TRADEMARK OFFICE
CERTIFICATE OF CORRECTION

PATENT NO.   :   4,894,985

DATED        :   January 23, 1990

INVENTOR(S) :    Claude A. G. Dubois et al

It is certified that error appears in the above-identified patent and that said Letters Patent is hereby corrected as shown below:

Col. 4, line 57, "open" should be --opened--.

Col. 5, line 32, "positioned" should be --position--; line 52, "may be define" should be --may define--.

Col. 6, line 12, "a" should be --an--; line 28, "may be define" should be --may define--; line 60, after "shown" insert --in--.

Signed and Sealed this

Sixth Day of August, 1991

*Attest:*

HARRY F. MANBECK, JR.

*Attesting Officer*

*Commissioner of Patents and Trademarks*